Oct. 3, 1961

T. W. MARTINEK ET AL 3,003,005

EXTRACTION PROCESS

Filed Dec. 27, 1957

INVENTORS
THOMAS W. MARTINEK
BY  NATHANIEL L. REMES
LEROI E. HUTCHINGS
ATTORNEY

United States Patent Office 3,003,005
Patented Oct. 3, 1961

3,003,005
EXTRACTION PROCESS
Thomas W. Martinek and Le Roi E. Hutchings, Crystal Lake, Ill., and Nathaniel L. Remes, Miami, Fla., assignors to The Pure Oil Company, Chicago, Ill., a corporation of Ohio
Filed Dec. 27, 1957, Ser. No. 705,699
12 Claims. (Cl. 260—674)

This invention relates to a process for the selective solvent extraction of aromatic hydrocarbons and alkyl-substituted homologues thereof from admixture with non-aromatic or paraffinic hydrocarbons. This invention is based on the discovery that a certain class of polar esters of carbamic acid and N-substituted carbamic acids in which the ester group contains at least one polar substituent, have good selectivity in the extraction of aromatic hydrocarbons from non-aromatic mixtures containing same.

The art recognizes the difficulties attendant on the separation of hydrocarbons having similar boiling points and many methods have been perfected for effecting such separations, including highly complex fractional distillations, chemical processes, selective adsorption, solvent extraction and the like. The solvent extraction process has been explored with particular vigor because of the availability of a vast number of new solvents and the general simplicity and efficiency of this method. For this purpose, many different solvents have been proposed and connected with various techniques for recovery of the desired extract from the extract phase and for solvent purification. Ordinarily in these solvent extraction processes, the extraction is effected in the liquid phase by thoroughly mixing the hydrocarbon mixture with the solvent, allowing the resultant mixture to separate into two phases and separating the phases by decantation. In vapor phase extractions the solvent is passed countercurrently to the vaporized hydrocarbon mixture in a contacting column equipped with extended contact surfaces. The overhead vapor phase contains the relatively more saturated hydrocarbons and the down-flowing liquid phase is essentially solvent in unsaturates.

The main problem in either vapor or liquid phase extractions is the separation of the aromatics from the solvent phase. The more effective the extractive characteristics of the solvent, the less ideal the solvent phase becomes and consequently the separation is correspondingly more difficult. Simple distillation or fractionation sometimes results in incomplete separation or contamination of the extract due to solvent decomposition at the temperature necessary to accomplish separation. Also, if the separation is not complete, the recycled solvent gradually loses its efficiency due to the accumulation of undesirable fractions therein. Where there is some contamination of the extract phase from the solvent extraction, separation of the unsaturates from the solvent is further complicated. In accordance with this invention, it has been found, in the course of testing a large number of selective solvents, that esters of carbamic acid and N-substituted carbamic acids, in which the ester group contains at least one polar constituent possess good selectivities toward aromatics, whereas similar esters in which the ester group does not contain a polar group do not exhibit such selectivity. The compounds which have been found to be good selective solvents in accordance with the invention may be represented by the general formula:

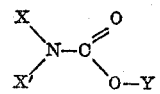

wherein X and/or X' are substituent groups which may broadly be hydrogen, alkyl groups, cycloalkyl groups, aryl groups, polar-substituted alkyl groups, polar-substituted aryl groups, and heterocyclic groups and Y is a polar-substituted alkyl, aryl, alkaryl, aralkyl, or cycloalkyl group. More specifically, X and/or X' may be selected substituents from the following groups: hydrogen, methyl, ethyl, propyl, isopropyl, butyl, isobutyl, tertiary butyl, amyl, isoamyl, cyclopentyl, cyclohexyl, cycloheptyl, phenyl, tolyl, xylyl, hydroxymethyl, hydroxyethyl, hydroxypropyl, hydroxyisopropyl, hydroxybutyl, hydroxyisobutyl, hydroxyamyl, hydroxyisoamyl, cyanomethyl, cyanoethyl, cyanopropyl, cyanobutyl, cyanoisobutyl, cyanoamyl, cyanoisoamyl, methoxymethyl, methoxyethyl, methoxypropyl, methoxyisopropyl, methoxybutyl, methoxyisobutyl, methoxyamyl, methoxyisoamyl, acetamidoethyl, acetamidopropyl, acetamidoisopropyl, acetamidobutyl, acetamidoisobutyl, acetamidoamyl, carboethoxyethyl, carboethoxypropyl, carboethoxyisopropyl, carboethoxybutyl and carboethoxyamyl. Additional specific substituent groups include nitrophenyl, i.e., 4-nitrophenyl, cyanophenyl, i.e., 4-cyanophenyl, morpholinyl, pyridyl and piperidinyl and the like.

Y in the above formula is a polar-substituted alkyl, aryl, alkaryl, aralkyl or cycloalkyl group including the aforementioned hydroxyalkyl, cyanoalkyl, methoxyalkyl, acetimidoalkyl and carboethoxyalkyl groups in relation to the definition of X and X'. Other polar groups that may be used in place of or along with the foregoing are the fluoro, chloro, iodo, and bromo groups.

It becomes therefore a primary object of this invention to provide a method of selectively extracting aromatic hydrocarbons from non-aromatic hydrocarbon mixtures containing same using certain polar-substituted carbamates and carbamic acid esters as herein defined.

Another object of this invention is to provide a method of selectively extracting aromatic hydrocarbons and alkyl-substituted homologues thereof from non-aromatic hydrocarbon mixtures containing same by treatment with a solvent comprising esters of carbamic acid and N-substituted carbamic acids of the general formula:

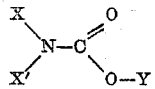

wherein X and/or X' are substituents selected from the group consisting of hydrogen, alkyl, cycloalkyl, aryl, polar-substituted alkyl, polar-substituted aryl, and heterocyclic radicals, and Y is a polar substituent.

A further object of the invention is to provide a method of producing substantially pure benzene by solvent extraction of a benzene-containing paraffinic hydrocarbon mixture with a mono- or di- or tri-polar-substituted ester of carbamic acid or N-substituted carbamic acid.

These and other objects of the invention will be related in whole or in part or become apparent from the description of the invention. The invention will be illustrated by a number of experiments and also by reference to the drawings wherein.

Figure 1:
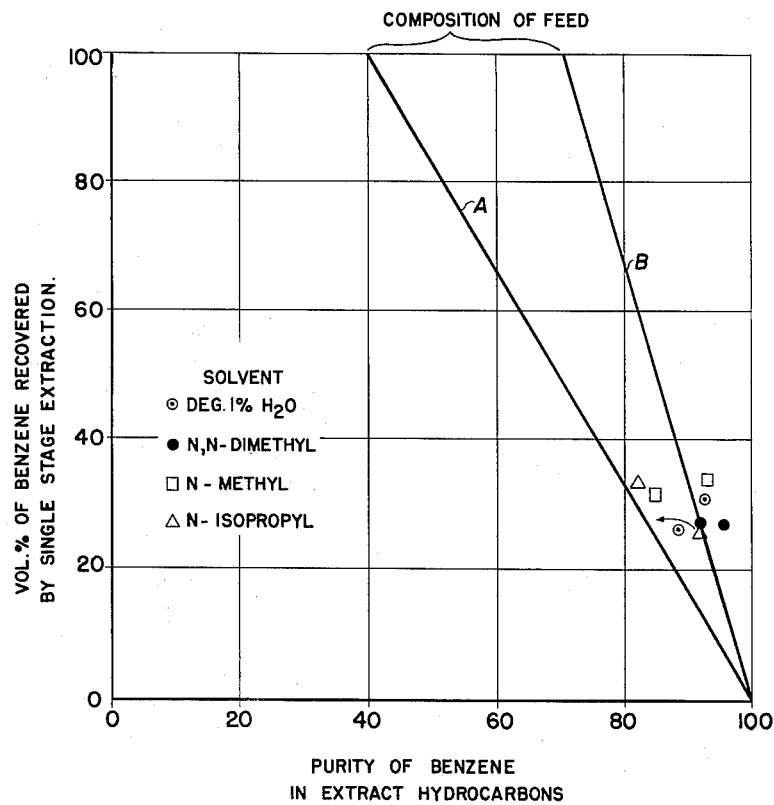
FIGURE 1 is a graph showing the extraction efficiencies of a number of solvents for direct comparison.

In order to demonstrate the invention, a series of experiments was conducted to determine the solubilities of a representative aromatic hydrocarbon and a representative paraffinic hydrocarbon in a large number of possible solvents. For this purpose, the solubilities were determined by shaking 5 ml. portions of benzene or heptane with a 5 ml. portion of the solvent under consideration in a graduated mixing cylinder until no further volume changes were visible in the two phases present or formed. The increase in the volume of the solvent phase was considered to be an indication of the solubility of the hydrocarbon in the solvent. In conjunction with the foregoing tests, a large number of solvents which showed the most promise were screened as to their selectivity by testing their effect upon a mixture consisting of 30% by volume of benzene and 70% by volume of heptane. In this series of selectivity tests, 5 ml. samples of the benzene-heptane mixture were shaken thoroughly with 5 ml. of the solvent in a graduated mixing cylinder until the volumes of the phases present or formed become constant. Any increase in the volume of the solvent phase was considered to be due to dissolution of benzene and heptane. This procedure is in accordance with accepted practice in the solvent extraction field and is widely used. From the information concerning the determination of the heptane solubility in the solvent, the ratios of benzene to heptane in the solvents were estimated quite accurately and approximate selectivities were determined. The results of these two types of screening tests are reported for carbamate esters, N-substituted carbamate esters and polar-substituted carbamate esters as indicated in Table I.

TABLE I

*Solubilities of benzene and heptane in certain carbamates*

| Solvent | Final volume of solvent phase [1] | | |
|---|---|---|---|
| | Heptane | Benzene | Benzene-heptane [2] |
| Ethyl carbamate, 60° C | 5.4 | | 6.50 |
| Butyl carbamate | (3) | | |
| Ethyl N-methyl carbamate | (3) | | |
| 2-hydroxyethyl N-methyl carbamate | 4.90 | 6.90 | 5.5 |
| 2-hydroxyethyl N-ethyl carbamate | 5.10 | (3) | 5.7 |
| 2-hydroxyethyl N-i-propyl carbamate | 5.10 | (3) | 6.3 |
| 2-hydroxyethyl N,N-dimethyl carbamate | 5.25 | (3) | 6.43 |
| Diethylene glycol [4] | 5.03 | 8.25 | 5.5 |

[1] Volume of solvent phase (ml.) after thoroughly mixing 5 ml. of solvent and 5 ml. of the hydrocarbon or hydrocarbon mixture.
[2] 30% benzene-70% heptane, by volume.
[3] Miscible.
[4] Commercially-used solvent used as comparative standard.

Some of the physical properties of the carbamate esters used in the foregoing experiments are shown in Table II.

TABLE II

*Physical properties of carbamates tested*

| Carbamate | B.P. (° C./ mm. Hg) | B.P. (calc.) (° C. at 760 mm.) | R.I. ($n_D^{20}$) |
|---|---|---|---|
| Ethyl | | 186 | |
| Butyl | | [1] 53–54 | |
| Ethyl N-methyl | 70–71/14 | 175 | 1.4178 |
| 2-hydroxyethyl N-methyl | 107–108/1.2 | 275 | 1.4516 |
| 2-hydroxyethyl N-ethyl | 139–142/8 | 275 | 1.4532 |
| 2-hydroxyethyl N-i-propyl | 114–122/0.5 | 335 | 1.4520 |
| 2-hydroxyethyl N,N-dimethyl | 82–86/1.2 | 245 | 1.4497 |

[1] M.P.

From the foregoing it is seen that the hydroxy-substituted carbamates encompassed by the general formula boil higher than the aromatics to be extracted. This respresents an advantage in solvent recovery and product purification as will be demonstrated. From Table I it is seen that diethylene glycol dissolves only about 0.03 ml. of heptane and about 3.25 ml. of benzene at room temperature and under atmospheric pressure.

Experience in conducting the foregoing screening tests on a large number of organic compounds as selective solvents, such tests being on both known compounds and new compounds, has indicated strongly a close correlation between the test results and those which can be expected of the solvents in pilot plant operation. Consequently, these screening tests constitute specific examples of this invention. In all probability, the selectivity of some of these solvents can be increased through the use of an anti-solvent such as water, as was used in the instance of diethylene glycol. Some solvents may be used with an anti-solvent without such a decrease in capacity as to make their use uneconomical commercially.

In line with the foregoing and to further develop the invention, a number of experiments were conducted to obtain the extraction efficiency of several N-substituted 2-hydroxyethyl carbamates in comparison with diethylene glycol, which latter represents one of the most efficient of the solvents presently in commercial use. This series of experiments was made to determine the product purity and percent recovery of aromatics from aromatic hydrocarbon-containing mixtures wherein the concentration of aromatic hydrocarbon was varied, and water was used with the solvents. These experiments represent single-stage contacting using solvent-to-oil ratios of 1:1, except as indicated, and maintaining the temperature at 100° F. The variations in aromatic content of the feed hydrocarbon mixture were such that the lowest concentration of aromatic was 40 volume percent and the highest concentration was 70 volume percent. Automatically, the lowest concentration of paraffinic hydrocarbon in the mixtures tested was 30 volume percent and the highest concentration was 60 volume percent. Each solvent was tested with a 70% benzene-30% heptane mixture with and without water, and with a 40% benzene-60% heptane mixture with and without water, except in the case of diethylene glycol which was tested using 1 volume percent water for both classes of feed mixtures. The results are shown in Table III.

TABLE III

Solvent properties of certain hydroxyethyl carbamates and diethylene glycol

Test conditions:
  100° F.
  1 vol. solvent/1 vol. hydrocarbon.
  Single-stage contact.

| Run No. | Solvent | H₂O vol. percent in total solvent | Feed hydrocarbon mixture | | Product | |
|---|---|---|---|---|---|---|
| | | | percent vol. benzene | percent vol. heptane | Purity, percent vol. benzene in extracted hydrocarbons | Recovery, percent vol. of benzene originally in feed |
| 1 | N-methyl-2-hydroxyethyl carbamate | None | 70 | 30 | 93.0 | 34.3 |
| 2 | ---do--- | None | 40 | 60 | 84.8 | 31.8 |
| 3 | N,N-dimethyl-2-hydroxyethyl carbamate | 20 | 70 | 30 | 94.7 | 19.5 |
| 4 | ---do--- | 20 | 40 | 60 | 92.0 | 27.6 |
| 5 | N-isopropyl 2-hydroxyethyl carbamate | 17 | 70 | 30 | ¹ 91.7 | ¹ 26.6 |
| 6 | ---do--- | 17 | 40 | 60 | ¹ 82.3 | ¹ 33.9 |
| 7 | DEG | 1 | 70 | 30 | 92.3 | 31.0 |
| 8 | DEG | 1 | 40 | 60 | 88.5 | 26.6 |

¹ Solvent/oil ratio was 1.2/1 in these 2 tests.

Comparing first experiments 2, 4 and 6 with experiment 8 where the lowest concentration of benzene was present in the feed hydrocarbon, it is seen that N,N-dimethyl 2-hydroxyethyl carbamate with 20 volume percent of water extracted about 1.0 volume percent more benzene than diethylene glycol and the purity of the product was 3.5% higher. In comparing experiments 1, 3 and 5 with experiment 7, it is seen that the highest product purity was obtained also by using N,N-dimethyl 2-hydroxyethyl carbamate with 20 volume percent of water with some loss in capacity on a one-stage contact basis. However, it is to be observed that N-methyl 2-hydroxyethyl carbamate produced a product of greater purity with greater capacity than diethylene glycol using hydrocarbon mixtures containing the highest concentration of benzene. Also, the data in Table III shows that N-isopropyl 2-hydroxyethyl carbamate (experiments 5 and 6) with 17.0 volume percent of water is almost equivalent to diethylene glycol for both the high and low concentrations of benzene.

These results are shown more clearly in graphic form in FIGURE 1. Lines A and B on the graph are the linear tie lines between 40% benzene feed material and pure benzene, and 70% benzene and pure benzene, respectively, to illustrate the changes in concentration involved. Thus, if the plot for a solvent fell to the left of line A for a 40% concentration benzene feed and below about 30 volume percent recovery, it would be considered quite ineffective. Similarly, a plot for a 70% concentration benzene feed falling to the left of line B would be considered inefficient. The fact that all of the points, as plotted for the solvents tests, fall to the right of their respective tie lines is indicative of increased efficiency and the fact that one point for the N-isopropyl 2-hydroxyethyl carbamate for a 40% concentration benzene feed falls in the region of the tie line B (as indicated by the arrow) is an indication of added extraction efficiency.

The polar-substituted carbamic acid esters and polar-N-substituted carbamic acids of this invention may be used in any liquid-liquid or liquid-vapor contact system in which the objective is to extract a predominance of the aromatic hydrocarbons, or alkyl-substituted homologues thereof from admixture with non-aromatic hydrocarbons. The feed may be treated in one tower or a series of towers, and with one or more successive portions of the carbamate solvent. The portions of solvent used in each successive treatment may vary in accordance with the extent of extraction sought. The process may be batch-wise or continuous, and counter-current flow in a vertical tower may be used.

Figure 2:
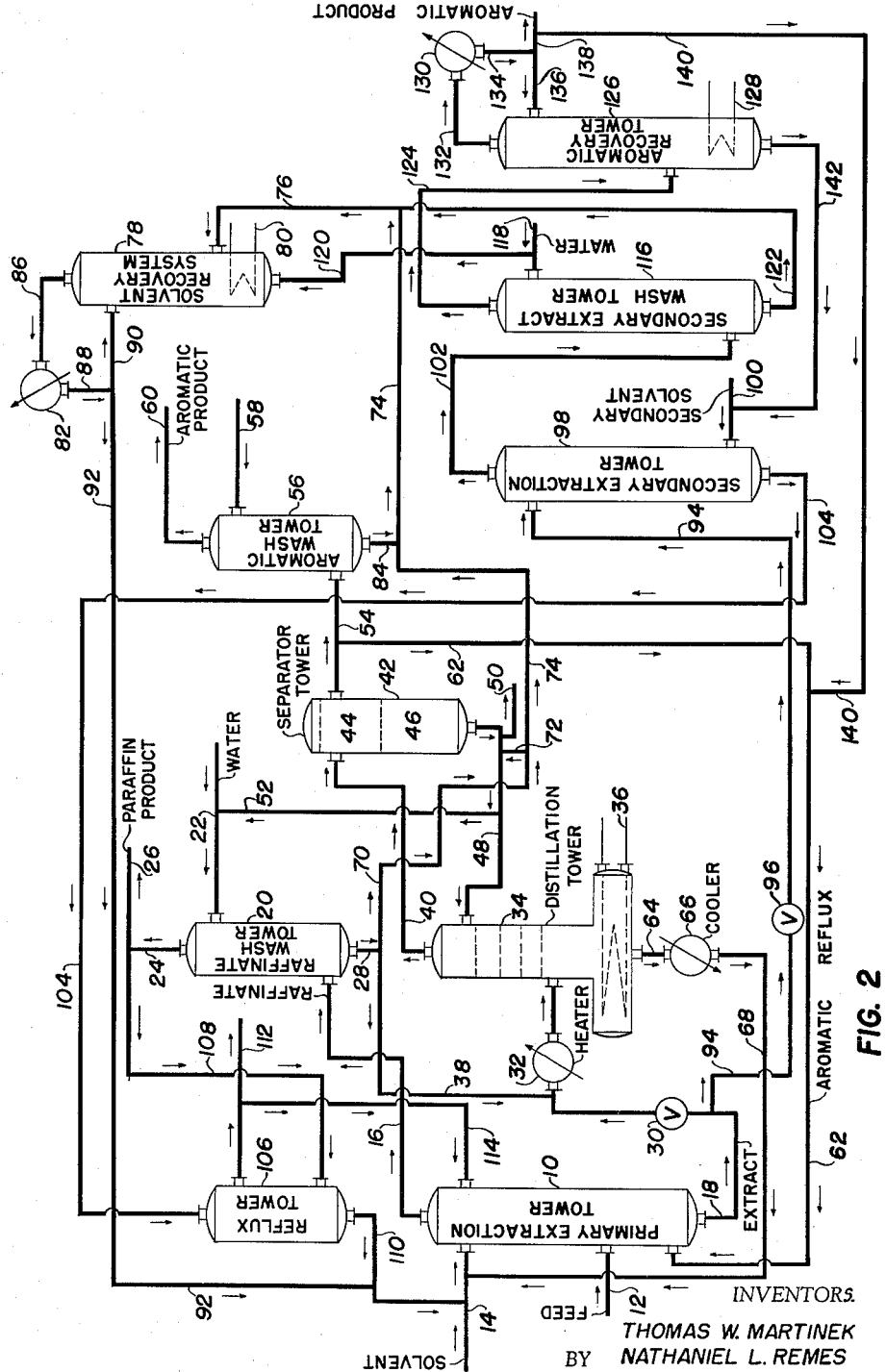
FIGURE 2 represents a general flow diagram of the process.

The invention is further illustrated by reference to FIGURE 2 which is a flow diagram of an extraction pilot plant used to evaluate the solvents herein. Referring to FIGURE 2, the feed hydrocarbon containing aromatics is introduced into primary extraction tower 10 by means of line 12 wherein the feed passes in counter-current contact with a carbamate solvent of this invention introduced at line 14. A raffinate containing a small amount of solvent and a predominance of the non-aromatic hydrocarbons leaves tower 10 via line 16, and an extract phase containing solvent and a high proportion of aromatics is removed at line 18. Various known methods of recovering the solvent and hydrocarbons from these separated phases may be used. The problem of solvent separation from the raffinate phase is generally not as acute as the separation of the solvent from the extract phase. Normally, with a stable solvent or with a solvent that, though being subject to decomposition on the application of heat, can be re-synthesized, the solvent and extract or raffinate hydrocarbons can be separated by distillation. This method is applicable to the polar carbamates of this invention in particular, because the solvents are not only relatively stable to heat but also boil at a higher temperature than the aromatics. Other methods of separation include water-washing of either or both phases and treatment of the extract phase with a high-boiling paraffinic hydrocarbon containing no contaminating unsaturated hydrocarbons to dissolve the aromatics and produce a denuded solvent phase. Although the techniques of water-washing of either or both phases, distillation of either or both phases, and treatment of the extract phase with a high-boiling paraffin may be used to separate the solvent from the phases and recover the solvent for purification, adjustment of water content, and recycle may be used in the process of this invention, it will be illustrated by application of only the water-washing and distillation techniques. As illustrated in FIGURE 2, water-washing is applied to the raffinate phase and distillation to the extract phase with an alternate procedure of treating the extract with a high-boiling paraffinic hydrocarbon to separate the solvent therefrom.

The raffinate phase in line 16 passes to paraffin wash-tower 20 wherein it is washed free of solvent by water introduced at line 22, producing a paraffin product leaving through line 24, into branch line 26 to storage (not shown). The resulting solvent-water mixture is drawn off at line 28, from which it may be withdrawn from the system or otherwise treated as hereinafter described.

The extract phase in line 18, controlled by valve 30, passes through heater 32 into distillation tower 34 heated by coil 36 which may be a reboiler coil or open-steam coil. A portion of the solvent-water extract phase from tower 20 may be passed into line 38 to join the extract phase in line 18 entering still 34. Heater 32 is used to supply at least part of the heat of distillation in tower 34 to produce an overhead comprising a mixture of water and aromatics in line 40 passing to separator tower 42. Sufficient residence time is allowed in tower 42 to form an upper aromatic phase indicated at 44 and a lower water phase indicated at 46, which latter is drawn off in line 48 and returned to tower 34 as reflux. A portion or all of the water stream in line 48 may be withdraw at draw-off 50 or used as raffinate wash-water in tower 20 by passage through branch line 52 or otherwise treated as hereinafter described.

The aromatic phase separated in tower 42 is drawn off at line 54 and sent to the bottom of aromatic wash-tower 56 wherein it is countercurrently contacted with water entering at line 58 to produce a relatively pure aromatic overhead product drawn off at line 60. The aromatic product from line 60 may be fractionated to recover particular types of aromatics therefrom and further purify same. A portion of the aromatic product in line 54 is sent into branch line 62 and returned to the bottom of primary extraction tower 10 as reflux.

The solvent-rich phase produced as bottoms in distillation tower 34 is withdrawn at line 64, and passed through cooler 66 into line 68 for return as reflux to line 14 entering tower 10. The water-wash stream 28 from raffinate wash-tower 20 may be passed in part through branch line 70, wherein it may join a part or all of the water phase from separator tower 42 from line 48 by means of branch line 72, and the combined water streams sent through line 74 and line 76 to solvent-recovery system 78 equipped with heating coil 80 and reboiler or condenser 82. This combined water stream may also contain a portion or all of the water-wash phase produced in tower 56 and drawn off at line 84 and joining line 74.

The overhead solvent-rich stream from solvent-recovery tower 78 in line 86 is condensed in condenser 82, and passed by means of line 88, either in branch line 90 as reflux in tower 78 or through line 92, back to primary extraction tower 10 to enter at line 14 or elsewhere along the column.

As an alternate procedure to recover aromatics from the extract phase stream 18 leaving tower 10, all or part of the extract stream is passed into branch line 94, controlled by valve 96, to the top of secondary extraction tower 98, wherein it flows downwardly against a stream of high-boiling paraffinic hydrocarbon or secondary solvent to be described, entering the system at line 100. In tower 98 the secondary solvent removes a substantial portion of the aromatics from the extract phase, producing an overhead at line 102 containing said secondary solvent and aromatics. As a result of this extraction, a solvent-rich phase is produced containing some secondary solvent which is drawn off at line 104 and sent to reflux tower 106. This stream is used to remove any remaining solvent in a portion of the paraffin product leaving tower 20 and passing through branch line 108 to the bottom of reflux tower 106. The resultant solvent-rich phase, now substantially free of non-aromatic or paraffinic constituents, passes to tower 10 as added reflux in line 110 and the paraffinic overhead therefrom taken off at line 112 is discarded or used as fuel blending stock, or a portion thereof may be passed through line 114 as a paraffinic reflux in tower 10.

The aromatic-secondary solvent (or paraffin oil) extract produced as overhead stream 102 in tower 98 is passed to secondary extract wash-tower 116 wherein it is counter-currently contacted with water introduced at line 118. A portion or all of the water-wash used in tower 116 may comprise the solvent-free bottoms from solvent-recovery tower 78 entering through draw-off line 120.

As a result of the treatment in tower 116, a substantial portion of any remaining solvent is removed from the secondary extract, producing a water-solvent solution taken off as bottoms in line 122 which may be discarded or sent into solvent-recovery system 78 through line 76. The overhead taken off by line 124, comprising secondary solvent and aromatics, is sent to aromatic-recovery tower 126, equipped with heating coil 128 and condenser 130. Tower 126 is heated by coil 128 to a temperature sufficient to distill off the aromatics from the higher-boiling secondary solvent, producing a purified aromatic fraction taken off by line 132, which is passed into condenser 130. The resulting liquid aromatic product is withdrawn at line 134, a portion is recycled via line 136, and the purified product is withdrawn at line 136 or portions thereof recycled back to line 62 and tower 10 via line 140. Bottoms comprising recovered secondary solvent is taken off at line 142 and recycled to line 100.

To further demonstrate the invention with a non-limiting example, a feed composition consisting of 32% by volume benzene and 68% by volume of paraffins was treated in an extraction tower on a pilot-plant scale with a solvent consisting of 80% by volume of N,N-dimethyl-2-hydroxyethyl carbamate and 20% by volume of water using the following operating conditions in the tower.

Extraction tower operating conditions:
    Solvent/feed ratio _____ 6/1.
    Reflux/feed ratio _____ 1.7/1.
    Solvent rate _____ 3.0 gal. p. hr.
    Feed rate _____ 0.51 gal. p. hr.
    Reflux rate _____ 0.88 gal. p. hr.

The extract was treated to distillation, with water reflux, at a still-pot temperature of 229° F. The paraffin product was washed with water to remove the trace amount of solvent that was present. The following product rates and compositions were obtained.

Product rates and compositions:
    Benzene product—
        0.16 gal. p. hr.
        99% by vol. benzene.
        1% by volume paraffin.
    Paraffin product—
        0.35 gal. p. hr.
        1% by vol. benzene.
        99% by vol. paraffin.

The product recovery and purity indicated by this example demonstrates the efficiency of the polar-substituted solvents of this invention.

The process of this invention is applicable to a wide variety of extraction conditions and methods of product recovery. Solvent-to-feed ratios of from about 0.5:1 to as high as 10:1 may be used. The extraction conditions may vary from ambient temperatures and atmospheric pressures to temperatures as high as the boiling point of the particular polar-carbamate solvent used. Pressures up to 30 p.s.i.g. or more may be applied to maintain the solvent in the liquid phase, thus allowing the use of higher temperatures. Where liquid-vapor contact is employed, the feed is introduced in vaporized form and refluxed with the liquid phase solvent.

The solvents of this invention may be used with or without an auxiliary or anti-solvent such as water, water-alcohol mixtures and such auxiliary solvents as are known in the art. Also, mixtures of two or more of the species of solvents may be used. In general, between about 0% to 25% by volume of the auxiliary solvent or anti-solvent, such as water, may be used. Adjustments in the amount of water may be made to attain the highest degree of efficiency of extraction for any given polar carbamate and feed combination or extraction condition and same are considered to be within the scope of this invention.

The process of this invention is applicable to the treatment of any type of hydrocarbon mixture from which economical amounts of aromatics, including benzene and alkyl homologues thereof, can be recovered. Such mixtures include products obtained from aromatization and similar reactions. The products obtained from catalytic reforming, hydrocracking and dehydrocyclization processes may be used as feed for the present process. Any mixtures containing a paraffinic- or naphthenic-type hydrocarbon admixed with benzene, toluene, the xylenes, that is, o-xylene, m-exylene and p-xylene, and also ethyl benzene, as simple or complex multicomponent mixtures, may be used as the starting material. Such feed materials as petroleum distillates, naphthas, gasoline, kerosene, fuel oil fractions, and gas oil fractions may be used. The charge material should be liquid at ordinary temperatures and not subject to decomposition at the extraction temperatures or reaction with the selective solvents used herein. One suitable charge oil is the class of products known in the art as catalytic reformates. These liquid products contain a fair concentration of desirable aromatic hydrocarbons. Catalytic reformates are obtained by treating naphthas to reforming, dehydrogenation, hydrocracking and dehydrocyclization reactions at temperatures ranging from 850° F. to about 1000° F. with pressures up to 500 p.s.i.g. in the presence of a metal-containing catalyst.

As a more specific illustration, catalytic reformates obtained as a result of the treatment of a virgin naphtha (BR 175° F.–400° F., API gravity 50° to 60°) with a platinum-alumina catalyst at 875° F. to 975° F. and pressures ranging from 200 to 500 p.s.i.g., may be used. Reformates so produced contain from about 30 to 55 vol. percent of aromatics and constitute a preferred feed for the present process. For example, reformates produced by reforming a 200°–400° F. virgin naphtha at about 930° F. and 325 p.s.i.g., in the presence of a catalyst comprising about 0.1 wt. percent of platinum on an aluminum base, are representative. In general, these reformates have a boiling range of about 125° to 400° F., an API gravity of 40° to 50°, and an aromatic content of 45–55 volume percent. A particularly suitable reformate is obtained by subjecting a charge naphtha having a boiling range of 178° F. to 389° F., an API gravity of 59.1°, a RON clear, of 44.6, a RON+0.3 TEL of 71.4 and containing 0.01% sulfur, about 91.0 vol. percent of paraffins and naphthenes, 1.0 vol. percent olefins, and 8.0 vol. percent aromatics, to reforming at about 930° F., to produce a product having an API gravity of 49.2°, and IBP of 128° F., and EBP of 405° F., a RON, clear, of 89.4, a RON+.3 cc. TEL of 98.2, and containing about 48.0 vol. percent paraffins and naphthenes, 1.0 vol. percent olefins and 51.0 vol. percent of aromatics. By precise fractionation and blending to different octane numbers, it was determined that this reformate feed material exhibited the following analysis:

TABLE IV

*Aromatics in reformate feed*

| Aromatic: | Vol. percent |
|---|---|
| Benzene | 4.19 |
| Toluene | 13.1 |
| Mixed xylene and ethyl benzene | 16.51 |
| $C_9$ and heavier | 17.2 |

Examples of the composition of other reformate feed hydrocarbons that may be used are shown in Table V giving the volume percent of aromatics in each, and the research octane level to which the reforming reaction was directed in each instance.

TABLE V

*Aromatics distribution in various reformates [1]*
*(volume percent)*

| Aromatic | 85 research octane level | 95 research octane level |
|---|---|---|
| Benzene | 2.96 | 3.41 |
| Toluene | 9.64 | 12.9 |
| Ethyl-benzene | 2.55 | 2.72 |
| p-Xylene | 2.74 | 2.83 |
| m-Xylene | 6.45 | 6.73 |
| o-Xylene | 3.96 | 3.81 |
| $C_9$ & heavier aromatics | 17.3 | 22.4 |
| Total | 45.6 | 54.8 |

[1] These reformate products were from different feed stocks.

In general these feed stocks contain a mixture in various proportions of i-butane, n-butane, i-pentane, n-pentane, cyclopentane, 2,2-dimethylbutane, 2,3-dimethyl butane, 2-methylpentane, 3-methylpentane, n-hexane, methylcyclopentane, 2,2-dimethylpentane, benzene, 2,4-dimethylpentane, cyclohexane, 2,2,3-trimethylbutane, 3,3-dimethylpentane, 1,1-dimethylcyclopentane, 2,3-dimethylpentane, 2-methylhexane, cis-1,3-dimethylcyclopentane, trans-1,2-dimethyl cyclopentane, 3-ethylpentane, n-heptane, 2,2-trimethylpentane, cis-1,2-dimethylpentane, methylcyclohexane, methylethylcyclopentane, and other $C_8$ hydrocarbons, toluene ethylbenzene, p-xylene, o-xylene and m-xylene. These represent the types of hydrocarbon mixtures from which the aromatics, as enumerated, can be separated by the present process. In using reformates as feed hydrocarbons, one purpose is to separate the low-octane components so that they may be recycled or otherwise upgraded in octane number, and the high-octane products recovered for gasoline blending.

Another type of feed mixture comprises various fractions and mixtures of fractions of reformates which may be used in this invention. For example, a reformate or other source of aromatics may be fractionated to form a benzene concentrate, a toluene concentrate and a xylene concentrate; these may be individually treated or mixed in various proportions and treated to solvent extraction in accordance with this invention to obtain products having a high concentration of the desired aromatic. One such feed material comprises a synthetic mixture of 1 part benzene concentrate, 2 parts toluene concentrate and 1 part xylene concentrate. The purpose of treating such concentrates is to recover aromatics of maximum purity for use as organic intermediates, solvents, etc.

The general and preferred conditions to be applied in the process steps of this invention, using the polar-carbamate solvents and the alternate means of extract and raffinate recovery disclosed herein, follow those used in the prior art solvent extraction processes. Primary extraction tower 10 is operated under conditions which produce an extract phase rich in aromatics leaving at line 18 and a raffinate phase containing the more paraffinic hydrocarbon along with a small amount of solvent leaving at line 16. Temperatures in tower 10 are from 40° F. to as high as 180° F. at pressures ranging from atmospheric to 10 or 15 p.s.i.g. The preferred conditions of extraction for highest efficiency and economy of operation are 100 to 140° F. at 5 p.s.i.g. Solvent/feed ratios may vary from 1:1 to 10 to 1.0 and ratios of about 5 to 1 are preferred. Since the solvents used herein generally boil at temperatures higher than the aromatic hydrocarbons extracted, distillation tower 34 is operated under conditions to accomplish the separation of aromatics as the overhead. For this purpose temperatures between about 185° to 300° F. under pressures between about 0.5 to 20 p.s.i.g. are used. Cooler 66 is operated under conditions whereby the bottoms solvent in line 64 is cooled to a temperature equivalent to that used in extraction tower 10.

In using the alternate method for extract recovery in which secondary extraction tower 98 is employed, this tower is operated under conditions such that the secondary solvent introduced at line 100 removes substantially all of the aromatic hydrocarbons present in the extract phase. In order to avoid the necessity of adding or subtracting heat from the extract phase passing through line 94, secondary extraction tower 98 is operated under substantially the same temperature and pressure conditions used in primary extraction tower 10. Similarly secondary extract wash-tower 116 is operated at the existing conditions of the extract phase entering same through line 102. Wash-water entering tower 116 via line 118 is at about 80° F., resulting in an overall extraction temperature in tower 116 between about 80 to 100° F. Similarly, solvent-recovery system 78 is operated at the existing conditions of the inlet stream passing through line 76 and the water entering at line 120. Aromatic recovery-tower 126 is heated by coil 128 to a temperature sufficient to distill off the aromatic product taken as overhead in line 132 and recovered at line 138. The temperature conditions applied in coil 126 will depend upon the boiling point of the particular aromatic product being recovered. Tower 126 may be operated at atmospheric pressures or at the pressures up to about 20 lbs. per square inch, depending on the particular product being recovered.

Raffinate wash-tower 20 is likewise operated at the temperature of its incoming stream 16 in conjunction with the inlet water stream 22. Sufficient water is used herein to remove substantially all of the solvents from the raffinate phase. In reflux tower 106 the primary solvent freed of a substantial amount of aromatics contained therein, represented by stream 104, is contacted with a portion of the paraffinic product entering at line 108 for the purpose of removing any remaining hydrocarbons that may be present. Tower 106 is operated at the temperatures existing in the incoming streams thereto. Where water is used throughout wash-water-to-feed ratios of from 0.01 to 0.05 to as high as 0.05 to 1.0 may be used.

What is claimed is:
1. The process of separating aromatic hydrocarbons from a mixture of aromatic and non-aromatic hydrocarbons comprising contacting said mixture with a stable hydroxy-substituted ester of carbamic acid having the formula,

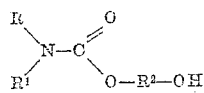

wherein R is an alkyl radical containing 1 to 5 carbon atoms, R¹ is a substituent of the group consisting of hydrogen and an alkyl radical containing 1 to 5 carbon atoms and R² is an alkylene radical containing 1 to 5 carbon atoms, separating the composite mixture into two components consisting of a raffinate and an extract and recovering said aromatic hydrocarbons from said extract.

2. The process of separating aromatic hydrocarbons from a mixture of aromatic and non-aromatic hydrocarbons comprising contacting said mixture with a stable hydroxy-substituted ester of carbamic acid having the formula,

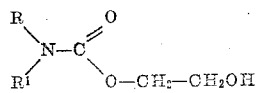

wherein R is an alkyl radical containing 1 to 5 carbon atoms, R¹ is a substituent of the group consisting of hydrogen and an alkyl radical containing 1 to 5 carbon atoms, at a temperature of about 20° to 180° F., separating the composite mixture into two components consisting of a raffinate and an extract and recovering said aromatic hydrocarbons from said extract.

3. The process in accordance with claim 2 in which said solvent is 2-hydroxyethyl N-methylcarbamate.

4. The process in accordance with claim 2 in which said solvent is 2-hydroxyethyl N-ethylcarbamate.

5. The process in accordance with claim 2 in which said solvent is 2-hydroxyethyl N-isopropylcarbamate.

6. The process in accordance with claim 2 in which said solvent is 2-hydroxyethyl N,N-dimethyl carbamate.

7. The process in accordance with claim 2 in which aromatic hydrocarbons are from the group consisting of benzene, toluene, ethylbenzene, o-xylene, m-xylene, p-xylene and mixtures thereof.

8. The process in accordance with claim 2 in which said hydrocarbon mixture is a catalytic reformate having a boiling range of about 100° to 450° F.

9. The process of separating aromatic hydrocarbons selected from the group of benzene, toluene, ethyl benzene, o-xylene, m-xylene, p-xylene from a mixture containing non-aromatic hydrocarbons which comprises contacting said mixture with 2-hydroxyethyl N-methyl carbamate at a temperature ranging from about 20° F. to 180° F., separating the composite mixture into two components consisting of an extract phase and a raffinate phase, heating said extract phase to a temperature sufficient to separate said aromatic hydrocarbons as an overhead and said solvent as a bottom fraction, and recycling sid solvent phase to said contacting step.

10. The process of separating aromatic hydrocarbons selected from the group of benzene, toluene, ethyl benzene, o-xylene, m-xylene, p-xylene from a mixture containing non-aromatic hydrocarbons which comprises contacting said mixture with 2-hydroxethyl N,N-dimethyl carbamate at a temperature ranging from about 20° F. to 180° F., separating the composite mixture into two components consisting of an extract phase and a raffinate phase, heating said extract phase to a temperature sufficient to separate said aromatic hydrocarbons as an overhead and said solvent as a bottom fraction, and recycling said solvent phase to said contacting step.

11. The process of separating aromatic hydrocarbons selected from the group of benzene, toluene, ethyl benzene, o-xylene, m-xylene, p-xylene from a mixture containing non-aromatic hydrocarbons which comprises contacting said mixture with 2-hydroxyethyl N-ethyl carbamate at a temperature ranging from about 20° F. to 180° F., separating the composite mixture into two components consisting of an extract phase and a raffinate phase, heating said extract phase to a temperature sufficient to separate said aromatic hydrocarbons as an overhead and said solvent as a bottom fraction, and recycling said solvent phase to said contacting step.

12. The process of separating aromatic hydrocarbons selected from the group of benzene, toluene, ethyl benzene, o-xylene, m-xylene, p-xylene from a mixture containing non-aromatic hydrocarbons which comprises contacting said mixture with 2-hydroxyethyl N-isopropyl carbamate at a temperature ranging from about 20° F. to 180° F., separating the composite mixture into two components consisting of an extract phase and a raffinate phase, heating said extract phase to a temperature sufficient to separate said aromatic hydrocarbons as an overhead and said solvent as a bottom fraction, and recycling said solvent phase to said contacting step.

References Cited in the file of this patent
UNITED STATES PATENTS

| 2,386,927 | Boyd | Oct. 16, 1945 |
| 2,594,044 | Loder | Apr. 22, 1952 |